United States Patent [19]

Johnson et al.

[11] Patent Number: 5,248,644

[45] Date of Patent: Sep. 28, 1993

[54] ZIRCONIA-PILLARED CLAYS AND MICAS

[75] Inventors: Jack W. Johnson, Clinton; John F. Brody, Bound Brook, both of N.J.

[73] Assignee: Exxon Research and Engineering Company, Florham Park, N.J.

[21] Appl. No.: 867,581

[22] Filed: Apr. 13, 1992

[51] Int. Cl.⁵ .............................................. B01J 21/16
[52] U.S. Cl. ...................................................... 502/84
[58] Field of Search ........................................... 502/84

[56] References Cited

U.S. PATENT DOCUMENTS

| | | | |
|---|---|---|---|
| 4,410,751 | 10/1983 | Shin et al. | 585/640 |
| 4,719,191 | 1/1988 | Battiste et al. | 502/84 |
| 4,742,033 | 5/1988 | Harris et al. | 502/60 |
| 4,757,040 | 7/1988 | Guan et al. | 502/63 |
| 4,775,461 | 10/1988 | Harris et al. | 208/120 |
| 4,920,086 | 4/1990 | Raythatha et al. | 502/84 |

FOREIGN PATENT DOCUMENTS

| | | |
|---|---|---|
| 0341023 | 2/1989 | European Pat. Off. |
| 254402/36 | 12/1988 | Japan . |
| 175972/24 | 5/1989 | Japan . |

OTHER PUBLICATIONS

Bartley, G. J. J., "Zirconium Pillared Clays," 1988, pp. 233-241, Catalysis Today, vol. 2, Elsevier Science Publishers B.V., Amsterdam—Printed in The Netherlands.

*Primary Examiner*—Carl F. Dees
*Attorney, Agent, or Firm*—Estelle C. Bakun

[57] ABSTRACT

The present invention is directed to improved zirconia-pillared clays exhibiting high crystallinity and layer spacing and significantly higher thermal stability prepared using zirconyl acetate as the pillaring agent by: (a) mixing a clay selected from the group consisting of smectite clays and fluoromicas with a solution of zirconyl acetate for a time and at a temperature sufficient to form a pillared clay product; (b) separating said pillared clay product formed from the solution; (c) washing the separated pillared clay product with water; (d) drying the separated, washed pillared clay product at a temperature from about 50° to 200° C.; (e) calcining the dried pillared clay product at a temperature from about 300° to 700° C.

8 Claims, 5 Drawing Sheets

ZIRCONIA-PILLARED CLAYS AND MICAS

FIELD OF THE INVENTION

Applicants have found an improved method of preparing zirconia-pillared clays, especially zirconia-pillared fluoromicas. The method is more convenient and reproducible, affording pillared clays with consistently higher crystallinity and layer spacing, and significantly higher thermal stability as compared with zirconia-pillared clays prepared in accordance with the prior art.

The zirconia-pillared clays prepared in accordance with the present invention, resist collapse when exposed to high temperatures and further maintain a significant surface area when subjected to steam contact.

Furthermore, the pillaring solution of the present invention need not be heated, thereby allowing the pillaring reaction to be carried out at ambient temperatures.

SUMMARY OF THE INVENTION

The present invention is directed to improved zirconia-pillared clays and a method of producing the same. The method comprises the steps of (a) mixing a clay selected from the group consisting of smectite clays and fluoromicas with a solution of zirconyl acetate for a time and at a temperature sufficient to form a pillared clay product;

(b) separating said pillared clay product formed from the solution;

(c) washing the separated pillared clay product with water;

(d) drying the separated, washed pillared clay product at a temperature from about 50° to 200° C.;

(e) calcining the dried pillared clay product at a temperature from about 300° to 700° C.

In a further embodiment the process additionally includes step (f) washing the pillared clay product following said calcination step (e) when said clay is a fluoromica.

The invention is further directed to an improved zirconia-pillared clay made in accordance with the process described in steps (a), (b), (c), (d), and (e), more preferably, when the clay is a fluoromica, the process will also include step (f).

The invention is further directed to the use of the present invention zirconia-pillared clay in hydrocarbon conversion reactions such as catalytic cracking.

The clays used in the present invention may be any smectite clay or fluoromica, however, the fluoromicas are preferred.

BRIEF DESCRIPTION OF THE DRAWINGS

FIGS. 1A-1D show X-ray powder diffraction patterns (CuKα radiation) of several zirconia-pillared micas. The Y axis is intensity and the X axis is the diffraction angle 2 theta for all views. FIG. 1A shows the zirconia-pillared mica prepared with varying amounts of zirconyl acetate as noted. FIG. 1D shows the effect of steaming at various temperatures on zirconia-pillared montmorillonite prepared with 23 mmoles of zirconia per gram of montmorillonite. Again, lines A, B, and C represent the same steaming temperatures as FIG. 1B. However, the surface areas following steaming were 20 m²/g, 86 m²/g, and 228 m²/g, respectively. The surface area of the unsteamed sample D was 388 m²/g.

DETAILED DESCRIPTION OF THE INVENTION

The catalysts of the present invention are prepared from naturally occurring and synthetic smectites, such as montmorillonite, beidellite, nontronite, saponite, hectorite, and fluorohectorite, and from synthetic fluoromicas such as sodium tetrasilicic mica (NaTSM) and synthetic taeniolite. Smectites and micas are formed of sheets that may be visualized as a sandwich comprising two outer sheets of silicon tetrahedra and an inner layer of aluminum octahedra (i.e. 2:1 layered clay). These clays are generally represented by the general formula:

$$A_x[M_{2\text{-}3}T_4O_{10}(Y)_2]$$

where M designates the octahedral cation, T designates the tetrahedral cation, A designates the exchangeable interlayer cations, $0 \leq X \leq 1$, and Y is hydroxy (OH) or fluorine (F) either singly or in combination. The T coordinated ion is commonly $Si^{+4}$, $Al^{30\ 3}$, or $Fe^{+3}$, but could also include several other four-coordinate ions, e.g., $p^{+5}$, $B^{+3}$, $Ga^{+3}$, $Cr^{+3}$, $Ge^{+4}$, $Be^{+2}$, etc. The M coordinated ion is typically $Al^{+3}$ or $Mg^{+2}$, but could also include many other possible hexacoordinate ions, e.g., $Fe^{+3}$, $Fe^{+2}$, $Ni^{+2}$, $Co^{+2}$, $Li^+$, $Cr^{+3}$, $V^{+2}$, etc. $Mg^{+2}$ is preferred in this invention.

Synthetic fluoromicas such as sodium tetrasilicic fluoromica $(Na[Mg_{2.5}Si_4O_{10}F_2])$ and lithium taeniolite $(Li[(Mg_2Li)Si_4O_{10}F_2])$ undergo swelling in water and other suitable polar solvents. Even though fluoromicas such as these exhibit high layer charge densities, they are capable of undergoing pillaring reactions with large cations. The resulting pillared tetrasilicic micas exhibit good thermal stability and are good catalytic cracking, isomerization, etc., catalysts.

The inorganic polymer, or pillaring agent, used to prepare the pillared clays of the present invention is zirconyl acetate, having a nominal formula of $ZrO(OH)_{0.5}(CH_3COO)_{1.5}$, which is commercially available.

The clay selected is contacted with an aqueous zirconyl acetate solution, which has been diluted with water or another suitable polar solvent, and allowed to react for a time and at a temperature sufficient to form a solid pillared clay material. This contacting is also referred as pillaring. Preferably the reaction will be carried out for about 0.2 to about 24 hours, more preferably, 1 to about 6 hours. The temperature during pillaring ranges between 0° to 50° C., preferably 15° to 35° C. Most preferably the reaction is carried out at room temperature. The amounts of zirconyl acetate solution and clay are chosen such that a desired ratio of Zr/clay will be obtained. The Zr/clay ratio will be at least about 4 mmole Zr per g of clay, preferably about 4 to about 46 mmole Zr per g of clay, most preferably about 23 mmoles Zr per g of clay. The resulting solid clay material obtained after contacting may then be separated from solution by filtration or centrifugation followed by washing with distilled water. The washing is continued until the acetic acid odor is not noticeable. The number of washes varies depending on the size of the sample and efficiency of wash. The number of washes is readily determinable by one skilled in the art. Generally about 4-8 washes will be sufficient. The material is then dried between about 50° and 200° C. The material is then calcined at a temperature of about 300° C. to 700° C., for about 1 to 24 hours, preferably the material will be held at a temperature at or above about 400° C. for about 1 to 24 hours. Calcination decomposes the zirconium hydroxy acetate complex and forms pillars of zirconium oxide. The resulting pillared clays may additionally be washed, for example, with water to remove labilized sodium, formed when utilizing NaTSM, and to obtain enhanced thermal stability.

The clays obtained from the present invention are microporous materials having two dimensional galleries with 10-12 angstrom height. The surface areas are about 300-400 m²/g and are stable to high temperatures, at or above 700° C. Micropore volumes calculated from the nitrogen isotherm using the t-plot method are 0.10 to 0.12 mL/g. The layer repeat distances are 20-22 angstroms as measured by X-ray diffraction. The zirconia-pillared clays of the present invention exhibit a high degree of order in the interlayer spacing following calcination. After steaming in 100% steam at 760° C. for 17 hours, the surface area in some cases is reduced only to about 200 m²/g. Hence, the zirconia-pillared clays of the present invention are capable of acting as catalysts after regeneration in the presence of steam.

EXAMPLE 1

Figure 1:
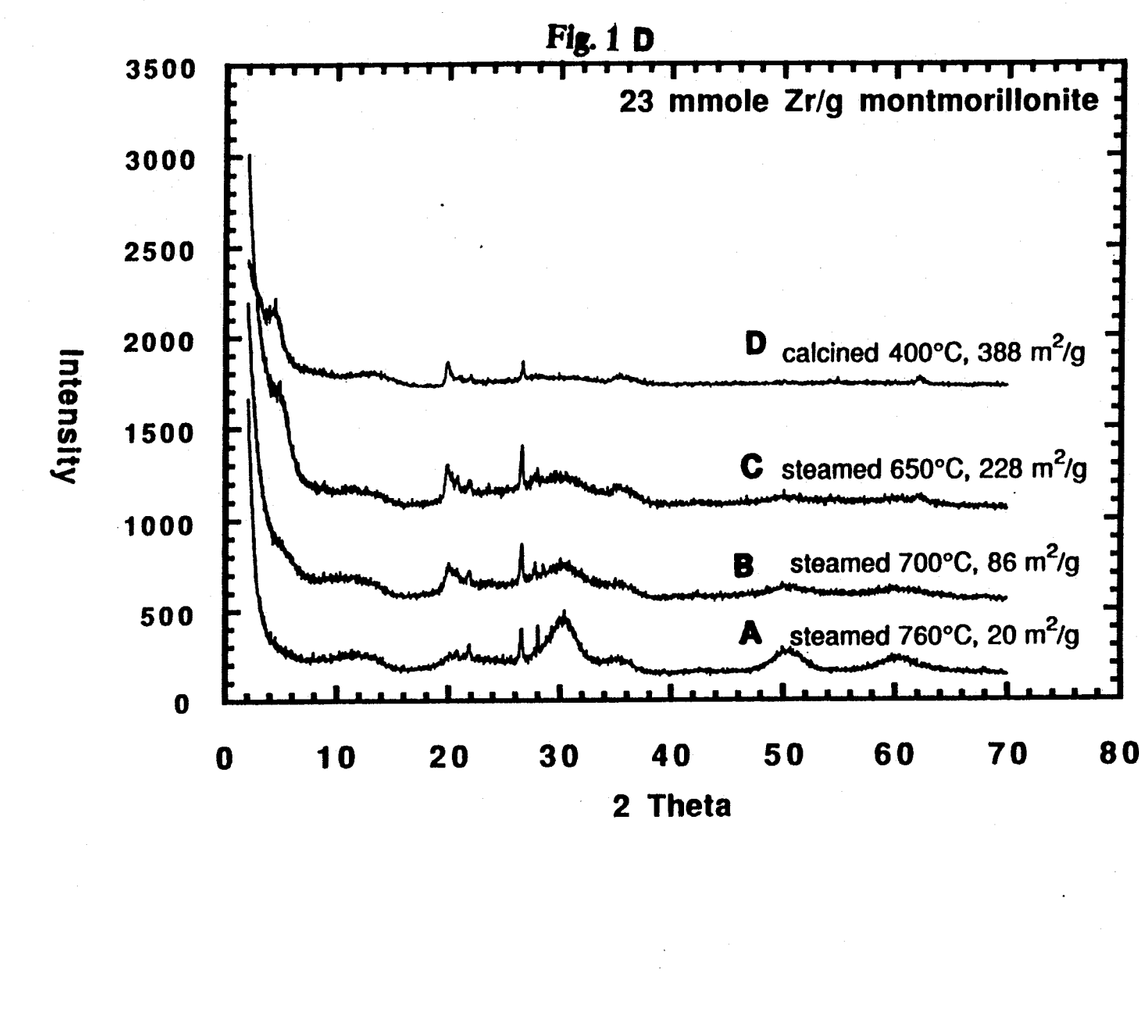
Figure 1A:
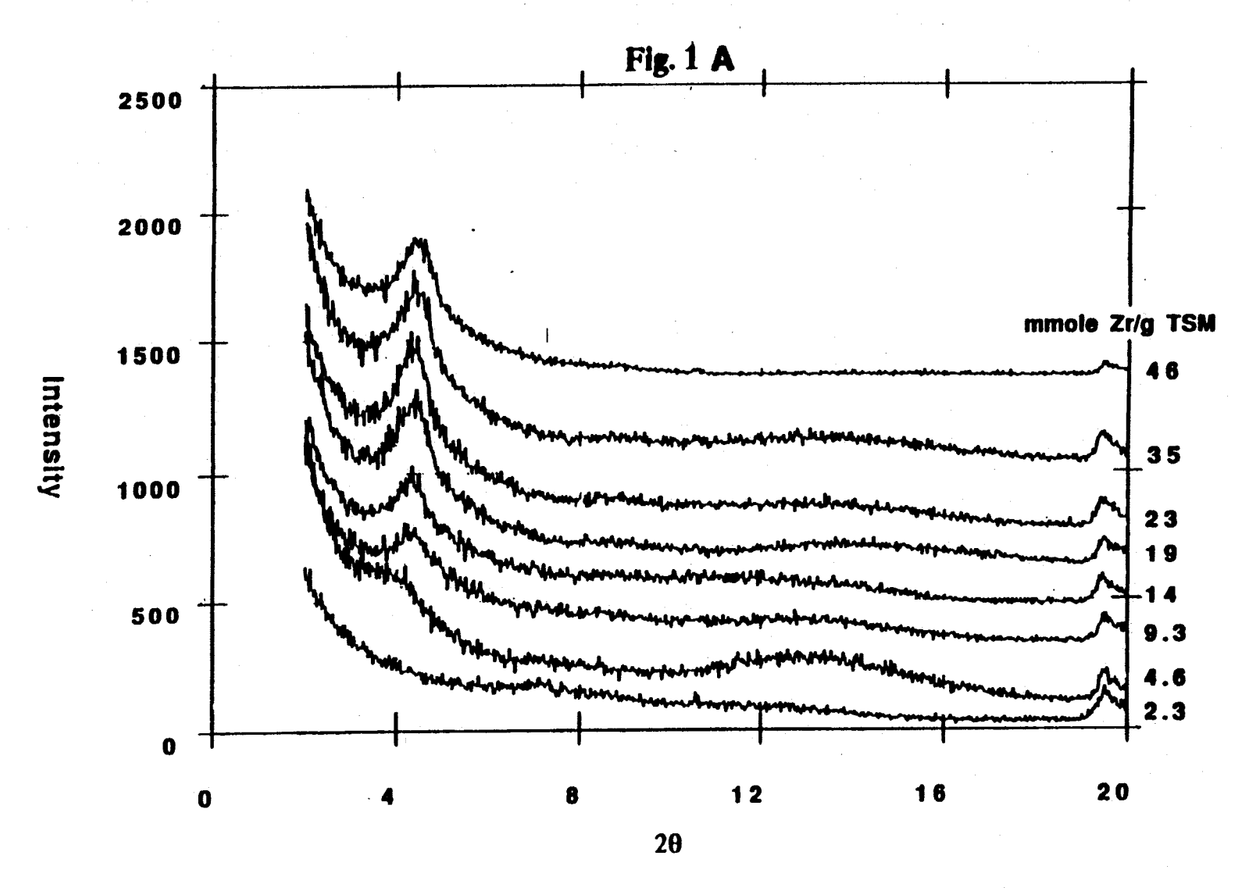

A series of experiments was carried out to ascertain the affect of the ratio of zirconium to TSM in the pillaring step. All reactions were carried out at room temperature for three hours. A series of eight samples was prepared in which the Zr/TSM ratio was 2.3, 4.6, 9.2, 13.8, 18.4, 23, 34.5, and 46 mmole Zr/g TSM. The amount of zirconyl acetate solution (ZAA), required to obtain the desired Zr/TSM ratio was added to 100 mL of distilled water and stirred at room temperature for 10 minutes. One gram of NaTSM was added and the resulting milky white dispersion was stirred for three hours at room temperature and then separated by centrifugation. The solid product was then washed by redispersion in 1 L of distilled water followed by separation by centrifugation. The washing procedure was repeated until the acetic acid odor was greatly reduced in the decantates (8 washes). The first wash produced a great deal of foam which required about 30 minutes to settle. The foaming disappeared after the second wash. The samples were then filtered and dried at 120° C. overnight. X-ray diffraction at this point in the reaction indicated that there was not a high degree of order in the interlayer spacing. Two broad weak peaks at about 20 and 10 angstroms were present on a high background in the low angle region of the diffraction patterns. The samples were then calcined in air at 200° C. for two hours, heated to 400° C. at 50° C./hr, and held at 400° C. for two hours. When the samples were calcined at 400° C., the resulting diffraction patterns had a significantly sharper and stronger peak at 20.1 to 20.6 angstroms depending on the Zr/TSM ratio. See FIG. 1A. The results indicate that an excess of zirconyl acetate in the pillaring step is beneficial in enhancing the crystallinity of the zirconia-pillared micas. When only 2.3 mmole Zr/g TSM was used, no diffraction maxima corresponding to an expanded interlayer spacing was observed. As the amount of zirconyl acetate is increased, a peak in the X-ray diffraction pattern appears at slightly greater than 20 angstroms and is maximized at a ratio of 23 mmole Zr/g TSM. The peak appears at all ratios from 9.3 to 46 mmole Zr/g TSM. The results are presented in Table I.

TABLE I

| ml ZrOAc/g TSM | 1 | 2 | 4 | 6 | 8 | 10 | 15 | 20 |
|---|---|---|---|---|---|---|---|---|
| mmole Zr/g TSM | 2.3 | 4.6 | 9.3 | 13.9 | 18.6 | 23.2 | 34.8 | 46.4 |
| g ZrO2/g TSM | 0.3 | 0.6 | 1.1 | 1.7 | 2.3 | 2.9 | 4.3 | 5.7 |
| surface area(m²/g) | 184 | 308 | 319 | 301 | 294 | 290 | 313 | 311 |
| micropore volume (mL/g) | 0.057 | 0.102 | 0.111 | 0.105 | 0.110 | 0.107 | 0.117 | 0.109 |
| % Zr | 16.24 | 21.32 | 19.28 | 19.62 | 18.20 | 17.88 | 17.66 | 17.72 |
| % Si | 20.54 | 16.82 | 18.70 | 20.42 | 19.12 | 20.06 | 19.96 | 22.14 |
| % Mg | 8.63 | 7.13 | 8.64 | 7.88 | 7.86 | 7.48 | 8.17 | 8.25 |
| % Na | 1.14 | 0.99 | 1.18 | 1.01 | 1.14 | 1.00 | 1.19 | 1.03 |

The analytical results indicate that at least three-fourths of the sodium in the interlayer space of the NaTSM is exchanged by the polyoxocations. Furthermore, the results show a maximum in zirconium content in the sample prepared with 4.6 mmole Zr/g TSM and a slight decrease in the amount of zirconium incorporated as the amount of zirconyl acetate used in pillaring increases.

Figure 2:
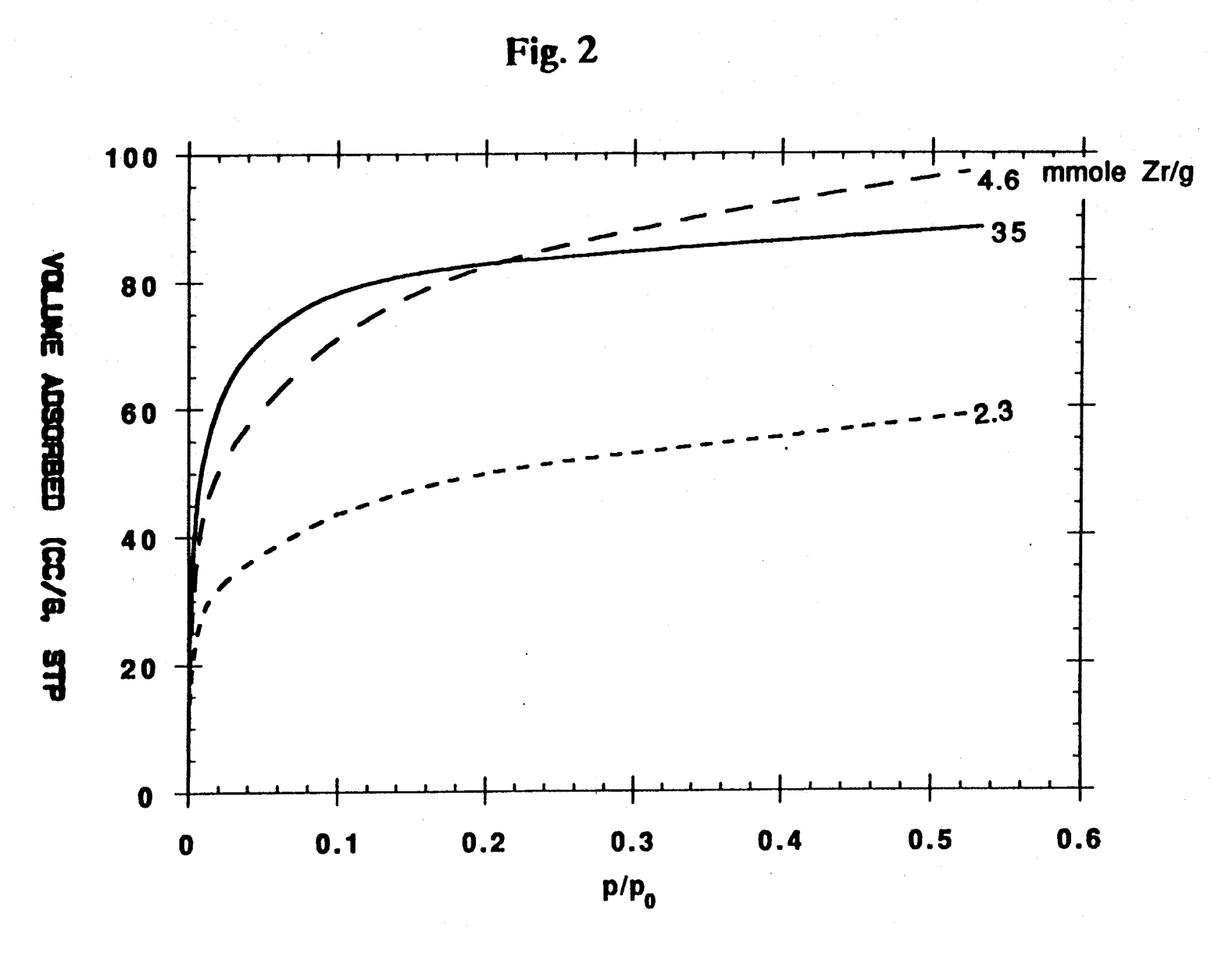
FIG. 2 shows the nitrogen adsorption isotherms (77° K.) of zirconia-pillared micas prepared with 4.6, 35, and 2.3 mL of zirconia per gram of tetrasilicic fluoromica. The Y axis is the volume of nitrogen gas adsorbed in cc/g at standard temperature and pressure. The X axis is the ratio of the measured vapor pressure to the saturated vapor pressure at 77° K.

The surface areas of the zirconia-pillared micas in this series are not as sensitive to the Zr/TSM ratio as are the X-ray crystallinities. As shown in Table I, the surface area of the sample prepared with the lowest amount of zirconyl acetate is only 184 m²/g, but the rest of the samples have surface areas between 290-319 m²/g. The shape of nitrogen uptake isotherms approaches ideal type 1 behavior as the crystallinity of the samples increases. FIG. 2 shows the isotherms for three representative samples prepared at Zr/TSM ratios of 2.3, 4.6, and 35 mmole Zr/g TSM. The isotherms for the samples prepared with ratios from 9 to 46 mmole Zr/g TSM were of a shape similar to that of the 35 mmole Zr/g TSM sample shown in the figure. Type 1 isotherms indicate the presence of micropores ($R_p < 20$ Å)

and are characteristic of zeolites and well-ordered pillared clays.

mately 1200 to 1400 cm³/min for 17 hours at controlled temperature.

TABLE III

| mmole Zr/g TSM | Surface Area (m²/g) of ZrTSM After Steaming 17 Hours in 100% Steam | | | |
|---|---|---|---|---|
| | Unsteamed | 650° C. Steam | 700° C. Steam | 760° C. Steam |
| 11.6, unwashed | 308 | 217 | 173 | 95 |
| 11.6, washed | 332 | 254 | 218 | 172 |
| 23.2, unwashed | 328 | 283 | 241 | 20 |
| 23.2, washed | 339 | 306 | 260 | 194 |
| 34.8, unwashed | 311 | 278 | 234 | 20 |
| 34.8, washed | 339 | 298 | 258 | 184 |

EXAMPLE 2

The amount of ZAA required to obtain Zr/TSM ratios of 11.6, 23.2, and 34.8 mmole Zr/g TSM was added to 750 mL of distilled water and stirred at room temperature for ten minutes. 10 g of NaTSM was added and the resulting milky white dispersion was stirred for three hours at room temperature. The products were isolated and calcined as described in Example 1. Half of each of the products was then stirred with 700 mL of distilled water at room temperature for 3 hours and then separated by centrifugation. This procedure was repeated three times over a twenty four hour period. The samples were filtered and dried at 120° C. overnight. The samples were then calcined in air at 250° C. for two hours then heated to 400° C. for two hours. The results are presented in Table II.

TABLE II

| | Calcined | Washed | Calcined | Washed | Calcined | Washed |
|---|---|---|---|---|---|---|
| ml ZrOAc/g TSM | 5 | 5 | 10 | 10 | 15 | 15 |
| mmole Zr/g TSM | 11.6 | 11.6 | 23.2 | 23.2 | 34.8 | 34.8 |
| g ZrO2/g TSM | 1.4 | 1.4 | 2.9 | 2.9 | 4.3 | 4.3 |
| surface area | 308 | 332 | 328 | 339 | 311 | 339 |
| micropore volume | 0.109 | 0.120 | 0.113 | 0.118 | 0.104 | 0.119 |
| % Zr | 23.20 | 24.00 | 21.75 | 22.15 | 21.60 | 22.22 |
| % Si | 19.35 | 20.10 | 20.35 | 20.30 | 20.45 | 20.75 |
| % Mg | 8.69 | 9.40 | 8.89 | 9.13 | 9.08 | 9.53 |
| % Na | 0.77 | 0.15 | 0.61 | 0.25 | 0.75 | 0.20 |

Calcination labilizes some of the sodium ions that are not exchanged by the zirconia pillaring cations and they can then be removed by a post calcination wash. The results show that the washed samples exhibit slightly higher surface area and micropore volumes than the unwashed samples of Example 1. The sample prepared with 12 mmole Zr/g TSM had a slightly higher zirconium content than the two samples prepared at higher Zr/TSM ratios, confirming the trend shown in the Example 1 samples. However, little variation was detected by X-ray diffraction, and nitrogen adsorption data show that the surface area and micropore volume are highest in the sample prepared with 23 mmole Zr/g TSM.

EXAMPLE 3

A series of steaming experiments was conducted at temperatures of 650°, 700°, and 760° C. Fresh 0.5 g samples of ZrTSM prepared with Zr/TSM ratios of 11.6, 23.2, and 34.8 mmole Zr/g were used. Two samples at each Zr/TSM ratio were prepared, one that had been washed after calcining as in Example 2, while the other was unwashed.

The ZrTSM samples were spread in a shallow layer inside quartz tubes and inserted into a steaming apparatus designed for deactivating cracking catalysts. The samples were exposed to pure steam flowing at approximately 1200 to 1400 cm³/min for 17 hours at controlled temperature.

The results of surface area measurement, presented in Table III, of the steamed samples indicate that as steaming temperature is increased, the difference in surface area between washed and unwashed samples becomes more pronounced. After steaming at 760° C. the washed sample having 23 mmole Zr/g TSM exhibited the highest surface area of 194 m²/g, only a 43% loss from its original surface area of 339 m²/g before steaming. In contrast, the same sample, without washing, when steamed at 760° C. lost 94% of its surface area, retaining only 20 m²/g.

The deleterious effects of small amounts of sodium on the hydrothermal stability of zirconia-pillared tetrasilicic mica becomes more important as the temperature of the steam treatment increases.

EXAMPLE 4

Figure 1B:
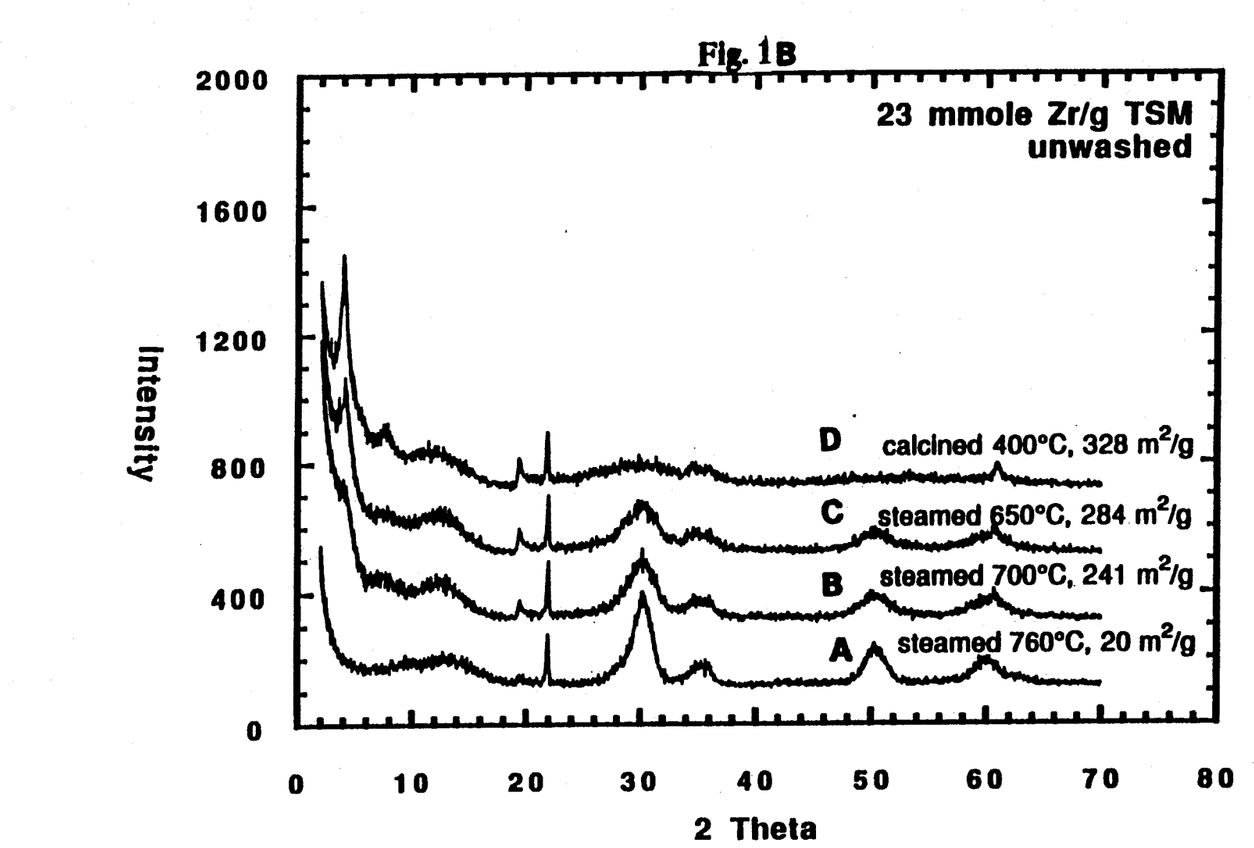
FIG. 1B shows the effect of steaming at various temperatures on zirconia-pillared micas prepared with 23 mmoles of zirconia per gram of tetrasilicic fluoromica. The pillared clays of FIG. 1B were steamed at 760° C. yielding a 20 m²/g surface area; 700° C., yielding a 241 m²/g surface area; 650° C., yielding a 284 m²/g surface area; and unsteamed, yield a 328 m²/g surface area, lines A, B, C, and D respectively.
Figure 1C:
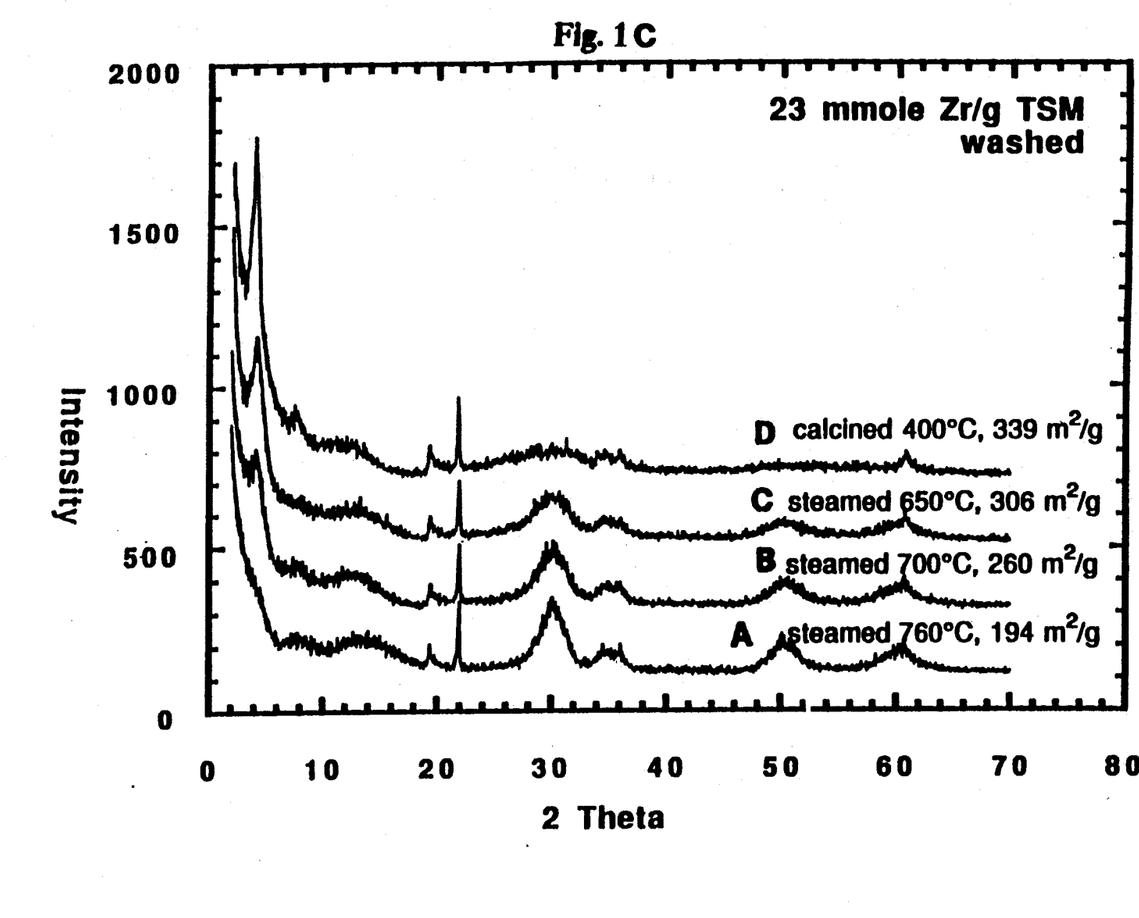
FIG. 1C again shows the effect of steaming at various temperatures on zirconia-pillared micas prepared with 23 mmoles of zirconia per gram of tetrasilicic fluoromica, however the micas underwent the washing step (f) following final calcination. Lines A, B, and C represent the same steaming temperature as in FIG. 1B. However, the surface areas following steaming were 194 m²/g, 260 m²/g, and 306 m²/g, respectively. The surface area for the unsteamed sample D was 339 m²/g.

A series of X-ray powder diffraction patterns of zirconia-pillared tetrasilicic mica samples prepared with 23 mmole Zr/g TSM, and steamed at 650°, 700°, and 760° C. were compared for both unwashed and washed samples prepared in accordance with the procedures outlined in Examples 1 and 2. (See FIGS. 1B and 1C respectively.) The enhancement of hydrothermal stability obtained by the removal of sodium by the post calcination wash was evident. The washed sample of zirconia-pillared tetrasilicic mica after 760° C. steaming had a surface area of 194 m²/g and a micropore volume of 0.073 mL/g, though the layer spacing line is no longer detectable in the X-ray powder diffraction pattern. The X-ray diffraction patterns exhibited broad new lines at 2 theta=30°, 35°, 50°, and 60° which grew with increasing temperature of steam treatment. The lines were in the position expected for the tetragonal phase of zirconium dioxide. There was no significant difference in the line widths of the $ZrO_2$ lines for the washed and unwashed samples before or after steaming at 650° and 700° C., but after-steaming at 760° C. the $ZrO_2$ lines in the diffraction pattern of the unwashed sample were sharper (see Table IV), demonstrating that sodium enhances the growth of $ZrO_2$ microcrystallites during steam treatment.

TABLE IV

|  |  | fhwm(°) | d(Å) |  |  | fhwm(°) | d(Å) |
|---|---|---|---|---|---|---|---|
| unwashed | 400° C. calcined | 4.92 | 17 | washed | 400° C. calcined | 5.1 | 16 |
|  | 650° C. steamed | 3.08 | 27 |  | 650° C. steamed | 3.3 | 25 |
|  | 700° C. steamed | 2.62 | 31 |  | 700° C. steamed | 2.72 | 30 |
|  | 760° C. steamed | 1.83 | 45 |  | 760° C. steamed | 2.23 | 37 |

Line widths (fwhm) and crystallite diameters (d) calculated from the Scherrer equation, $d = 0.9\lambda/(\text{fwhm} \cdot \cos\theta)$, for zirconia-pillared tetrasilicic mica prepared with 23 mmole Zr/g TSM, using the 101 line of tetragonal $ZrO_2$ at $2\theta = 29.1°$.

EXAMPLE 5

(comparative)

A sample of zirconia-pillared was mica prepared by treating a dilute aqueous suspension of size-fractionated NaTSM with an aqueous solution of zirconyl chloride, the pillaring agent commonly employed by the prior art, followed by washing and calcination at 400° C. to form zirconia pillared TSM. The sample was prepared using a solution of $ZrOCl_2.4H_2O$ that had been refluxed for 24 hours prior to pillaring at room temperature. The layer spacing of the sample was 21 angstroms, however the sample did not show a high degree of order as demonstrated by its X-ray powder diffraction pattern. The peak representing the layer spacing was only a shoulder on the low angle background unlike the sharp peak observed for NaTSM pillared with zirconyl acetate in accordance with the present invention. The sample exhibited a surface area of only 231 m²/g. Additionally, reproducible results were not obtainable. In preparing a large batch of ZrTSM pillared by zirconyl chloride, the 21 angstrom shoulder observed previously in the X-ray powder diffraction pattern was absent after calcination of the product at 400° C. and the surface area was only 108 m²/g. After steaming for 17 hours in 100% steam at 700° C., the surface area of the zirconyl chloride pillared TSM fell to 48 m²/g, and to 31 m²/g after 760° C. calcination. The results demonstrate both the superior reproducibility of the zirconyl acetate preparation and the higher crystallinity and stability of the pillared micas produced from it.

EXAMPLE 6

Zirconia-pillared clay using montmorillonite

A commercially available montmorillonite (bentonite HPM-20 from American Colloid Company) was pillared with zirconia following a procedure similar to that of Example 1. ZAA solution (100 mL, 232 mmole Zr) was diluted with 750 mL distilled water. 10.0 g montmorillonite was added and the resulting suspension was stirred at ambient temperature for 3 hours. The solid was separated by filtration and dried at 120° C. The sample was then calcined in a muffle furnace at 200° C. for two hours, heated to 400° C. at 50° C./hour, and held at 400° C. for 2 hours. The layer spacing measured by X-ray diffraction was 20.2 Å and the surface area was 388 m²/g. Steaming tests were carried out on this sample of Zr-montmorillonite as described in Example 3. After steam treatment at 650° C. for 17 hours, the surface area is 228 m²/g; after steam treatment at 700° C. for 17 hours, the surface area is 86 m²/g; and steam treatment at 750° C. for 17 hours, the surface area is 20 m²/g. X-ray diffraction patterns of the sample before and after steam treatments are displayed in FIG. 1D. The diffraction line corresponding to the ~20 Å layer spacing is maintained after 650° C. steaming, but disappears after steam treatment at 700° or 760° C., in conjunction with loss of most of the surface area.

EXAMPLE 7

An olefin isomerization reaction catalyzed by zirconia-pillared tetrasilicic mica Zirconia-pillared tetrasilicic mica (Zr-TSM) was prepared according to the procedure of Example 2 using 23 mmole Zr/g clay. Part of the sample was washed after calcination and recalcined. For a comparison, alumina-pillared tetrasilicic mica was prepared in a similar manner using aluminum chlorhydrol solution in place of the ZAA solution. The samples were characterized by measuring their layer repeat distance by X-ray diffraction and their surface areas by nitrogen adsorption. The results are given in Table V. The results for a standard $\gamma$-$Al_2O_3$ catalyst that had been impregnated with 0.9% Cl have also been included for comparison.

The solid acidity of the pillared clays was assessed by measuring the rate of isomerization of a model olefin, 2-methylpent-2-ene (2MP2), in the vapor phase over the pillared clay catalysts. The reactions were carried out in a standard fixed bed reactor equipped with a furnace for temperature control, flow controllers and saturators to control the feed stream, and an online gas chromatograph to identify the products of the reaction. Pillared clay samples (1 g) were pretreated at 500° C. in 500 cc/min $H_2$ flow, and then purged with 500 cc/min He while cooling to 250° C. 2MP2 (7% in He) was flowed over the catalyst at atmospheric pressure for one hour at 250° C., then the temperature was raised to 350° C. The conversions and product ratios measured at 350° C. and 2 hour total time on stream are reported in Table V.

The results of the 2MP2 isomerization tests show that the postcalcination wash enhances the acidity of the pillared micas. The sample of Zr-TSM that was not washed showed a 2MP2 conversion of 38.6% while the Zr-TSM after washing and recalcination gave a 2MP2 conversion of 65.2%. The distribution of the strengths of the acid sites in the solid is addressed by the rate ratios in Table V. The isomerization of 2MP2 to 4-methylpent-2-ene (4MP2) requires only a hydrogen shift and can be catalyzed by a relatively weak acid site. The isomerization of 2MP2 to 3-methylpent-2-ene (3MP2) involves a methyl shift and requires a moderately strong acid site. The isomerization of 2MP2 to 2,3-dimethylbutene (23DMB) is a more extensive skeletal rearrangement and requires a strong acid site to facilitate it. The ratio of 3MP2/2MP2 shown in the results for the washed Zr-TSM shows a relatively large proportion of the acid sites in this material have a moderate level of acidity, while the low ratio 23DMB/2MP2 show that there are few acid sites of high strength. The acidity distribution in Zr-TSM is similar to that found in Al-TSM, and narrower than that found in Cl/Al$_2$O$_3$ because there are relatively fewer strong acid sites.

TABLE V

|  | Conversion (mol %) | 3MP2/ 4MP2 | 23DMB2/ 4MP2 | Surface Area (m$^2$g) | Layer Spacing (Å) |
| --- | --- | --- | --- | --- | --- |
| Zr—TSM calcined | 38.6 | 0.40 | 0.036 | 360 | 21.8 |
| Zr—TSM washed | 65.2 | 1.29 | 0.13 | 394 | 21.7 |
| Al—TSM calcined | 38.5 | 0.50 | 0.040 | 393 | 18.0 |
| Al—TSM washed | 73.2 | 1.89 | 0.26 | 394 | 18.4 |
| 0.9% Cl/Al$_2$O$_3$ | 67.8 | 1.44 | 0.66 |  |  |

What is claimed is:

1. A method for producing a zirconia-pillared clay having enhanced crystallinity and thermal stability and having a layer spacing ranging from about 20 to 22 angstroms comprising the steps of:
    (a) mixing a clay selected from the group consisting of smectite clays and fluoromicas with a solution of zirconyl acetate for a time and at a temperature sufficient to form a pillared clay product;
    (b) separating said pillared clay product formed from the solution;
    (c) washing the separated pillared clay product with water;
    (d) drying the separated, washed pillared clay product at a temperature from about 50° to 200° C.;
    (e) calcining the dried pillared clay product at a temperature from about 300° to 700° C.

2. A method according to claim 1 wherein when said clay is a fluoromica, the method further comprises washing said pillared clay product following said calcination step (e).

3. The method according to claim 1 wherein the amounts of said clay and said zirconyl acetate solution are chosen such that the ratio of zirconium to clay obtained will be at least about 4 mmole zirconia per gram of clay.

4. A method according to claim 1 wherein said contacting step (a) is carried out for about 0.2 to about 24 hours.

5. A method according to claim 1 wherein said contacting step is carried out at a temperature of between 0° and 50° C.

6. A method according to claim 1 wherein said contacting step (a) is preferably carried out at ambient temperature.

7. A method according to claim 1 wherein during said calcination step (e), said dried pillared clay product is preferably calcined at or above 400° C. for at least about 1 to about 24 hours.

8. A zirconia-pillared clay having gallery heights of 10 to 12 angstroms and layer repeat distances of about 20 to 22 angstroms prepared by the method of:
    (a) mixing a clay selected from the group consisting of smectite clays and fluoromicas with a solution of zirconyl acetate for a time and at a temperature sufficient to form a pillared clay product;
    (b) separating said pillared clay product formed from the solution;
    (c) washing the separated pillared clay product with water;
    (d) drying the separated, washed pillared clay product at a temperature from about 50° to 200° C.;
    (e) calcining the dried pillared clay product at a temperature from about 300° to 700° C.

* * * * *